United States Patent [19]
Maruyama

[11] Patent Number: 5,471,349
[45] Date of Patent: Nov. 28, 1995

[54] DRIVE CIRCUIT FOR A DUAL-ELEMENT MAGNETIC HEAD ASSEMBLY WHICH INCLUDES AN ENCODOR, FLIP-FLOP CIRCUIT, RECORD BIT ADDING CIRCUIT, AND RECORD AMPLIFIER

[75] Inventor: Takao Maruyama, Tokyo, Japan

[73] Assignee: NEC Corporation, Tokyo, Japan

[21] Appl. No.: 251,648

[22] Filed: May 31, 1994

Related U.S. Application Data

[63] Continuation of Ser. No. 868,493, Apr. 15, 1992, abandoned.

[30] Foreign Application Priority Data

Apr. 15, 1991 [JP] Japan .................... 3-108297

[51] Int. Cl.$^6$ .................. G11B 5/09; G11B 5/03
[52] U.S. Cl. .................. 360/46; 360/48; 360/66
[58] Field of Search .................. 360/113, 126, 360/31, 46, 48, 66, 119, 125; 338/32 R

[56] References Cited

U.S. PATENT DOCUMENTS

| | | | |
|---|---|---|---|
| 4,613,918 | 9/1986 | Kanai et al. | 360/113 |
| 4,663,684 | 5/1987 | Kamo et al. | 360/125 X |
| 4,807,074 | 2/1989 | Kamo | 360/113 |
| 4,816,948 | 3/1989 | Kamo et al. | 360/113 |
| 4,821,012 | 4/1989 | Kamo et al. | 338/32 R |
| 4,841,399 | 6/1989 | Kitada et al. | 360/113 |
| 4,843,365 | 6/1989 | Seo | 338/32 R |
| 4,922,606 | 5/1990 | Alexander et al. | 360/113 |
| 4,967,298 | 10/1990 | Mowry | 360/113 |
| 5,032,943 | 7/1991 | Katsumata et al. | 360/113 |
| 5,079,662 | 1/1992 | Kawakami et al. | 360/113 |
| 5,181,149 | 1/1993 | Katsumata et al. | 360/119 |
| 5,218,497 | 6/1993 | Tanabe et al. | 360/113 |
| 5,325,253 | 6/1994 | Chen et al. | 360/113 |

FOREIGN PATENT DOCUMENTS 61-145718  7/1986  Japan .................... 360/113

*Primary Examiner*—Aristotelis Psitos
*Assistant Examiner*—Patrick Wamsley
*Attorney, Agent, or Firm*—Foley & Lardner

[57] ABSTRACT

A circuit for driving a dual-element magnetic head assembly made up of a magnetoresistive (MR) readback head and a recording head for recording and reproducing data out of a magnetic recording medium. When the head assembly ends a recording operation, the last recording magnetic field is oriented in a direction for deepening the bias to a MR element at all times. A bias electric field for the MR element is continuously applied even during recording operation. The circuit, therefore, stabilizes the bias to the MR element at the end of a recording operation, reduces noise during readback operation, and prevents the readback output from fluctuating every time a recording operation is performed.

7 Claims, 9 Drawing Sheets

DRIVE CIRCUIT FOR A DUAL-ELEMENT MAGNETIC HEAD ASSEMBLY WHICH INCLUDES AN ENCODOR, FLIP-FLOP CIRCUIT, RECORD BIT ADDING CIRCUIT, AND RECORD AMPLIFIER

This application is a continuation of application Ser. No. 07/868,493, filed Apr. 15, 1992, now abandoned.

BACKGROUND OF THE INVENTION

The present invention relates to a circuit for driving a magnetic head incorporated in a magnetic disk drive, for recording and reproducing data from a magnetic disk or similar magnetic recording medium, particularly a dual-element magnetic head assembly made up of a magnetoresistive (MR) readback head and a recording head.

A MR head using a MR element has inherently high sensitivity, and produces an output which does not depend on the relative speed between the head and a recording medium, although its application is limited to readback. The MR head is, therefore, a promising implementation for a miniature and large capacity magnetic disk drive. To mount the MR head on a magnetic disk drive, it is preferable to construct it into a single assembly together with a recording head. Should independent heads on different sliders be assigned to the recording and reproduction of data, each head would need an exclusive access time to thereby limit data throughput. A conventional dual-element magnetic head assembly is constituted by an upper and a lower magnetic yoke, a coil mounted between the yokes and generating a record magnetic field in response to a current, an upper and a lower shield, and a MR element disposed in a readback gap defined between the shields. In a record mode, a current flows through the coil to generate a recording magnetic field to thereby record data in a magnetic disk or similar medium. In a readback mode, the MR element senses transitions of magnetic field ascribable to a magnetization pattern recorded in the disk as changes in resistance, so that an output voltage is produced from the sense current.

However, the problem with the conventional dual-element head assembly is that the magnetization condition of the MR element is often disturbed by the recording magnetic field in the event of a recording operation. Specifically, the recording magnetic field also acting on the MR element is sufficiently intense, compared to the coercive force of a magnetic recording medium, and is greater than 1000 oersteds. By contrast, a bias electric field applied to the MR element is as weak as about tens of oersteds. In such a condition, the magnetization of the MR element repetitively reverses in direction depending on the orientation of the recording magnetic field. If the reversal of magnetization of the MR element involves hysteresis, the bias to the MR element increases when the recording magnetic field at the end of a recording operation is the same in direction as the bias magnetic field for the MR element, or lessens when the former is opposite to the latter. When the bias to the MR element changes with the orientation of the recording magnetic field at the end of a recording operation, the readback sensitivity of the MR element and, therefore, the readback output, fluctuates.

SUMMARY OF THE INVENTION

It is, therefore, an object of the present invention to provide a magnetic head drive circuit which stabilizes a bias to a MR element at the end of a recording operation, allows a minimum of noise to occur during readback, and prevents the readback output from fluctuating every time a recording operation is performed.

In accordance with the present invention, in a magnetic head drive circuit for driving a dual-element magnetic head assembly having a MR readback head made up of a MR film, a non-magnetic film and a soft magnetic film for applying a magnetic bias to the MR film, and a recording head having a magnetic yoke made up of an upper and a lower magnetic film, a coil wound around the magnetic yoke, and a gap formed between the upper and lower magnetic films at the side where the recording head faces a magnetic recording medium, the last recording magnetic field in the event of transition of the dual-element head assembly from a recording operation to a readback operation is generated in the same direction at all times and coincides in direction with the magnetization of the soft magnetic film.

Also, in accordance ,with the present invention, in a magnetic head drive circuit for driving a dual-element magnetic head assembly having a MR readback head made up of a MR film and a conductive metallic film, and a recording head having a magnetic yoke made of an upper and a lower magnetic film, a coil wound around the magnetic yoke, and a gap formed between the upper and lower magnetic films at the side where the recording head faces a magnetic recording medium, the last recording magnetic field in the event of transition of the dual-element head assembly from a recording operation to a readback operation is generated in the same direction at all times and coincides in direction with a bias magnetic field for the MR film generated by a current which flows through the conductive metallic film.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
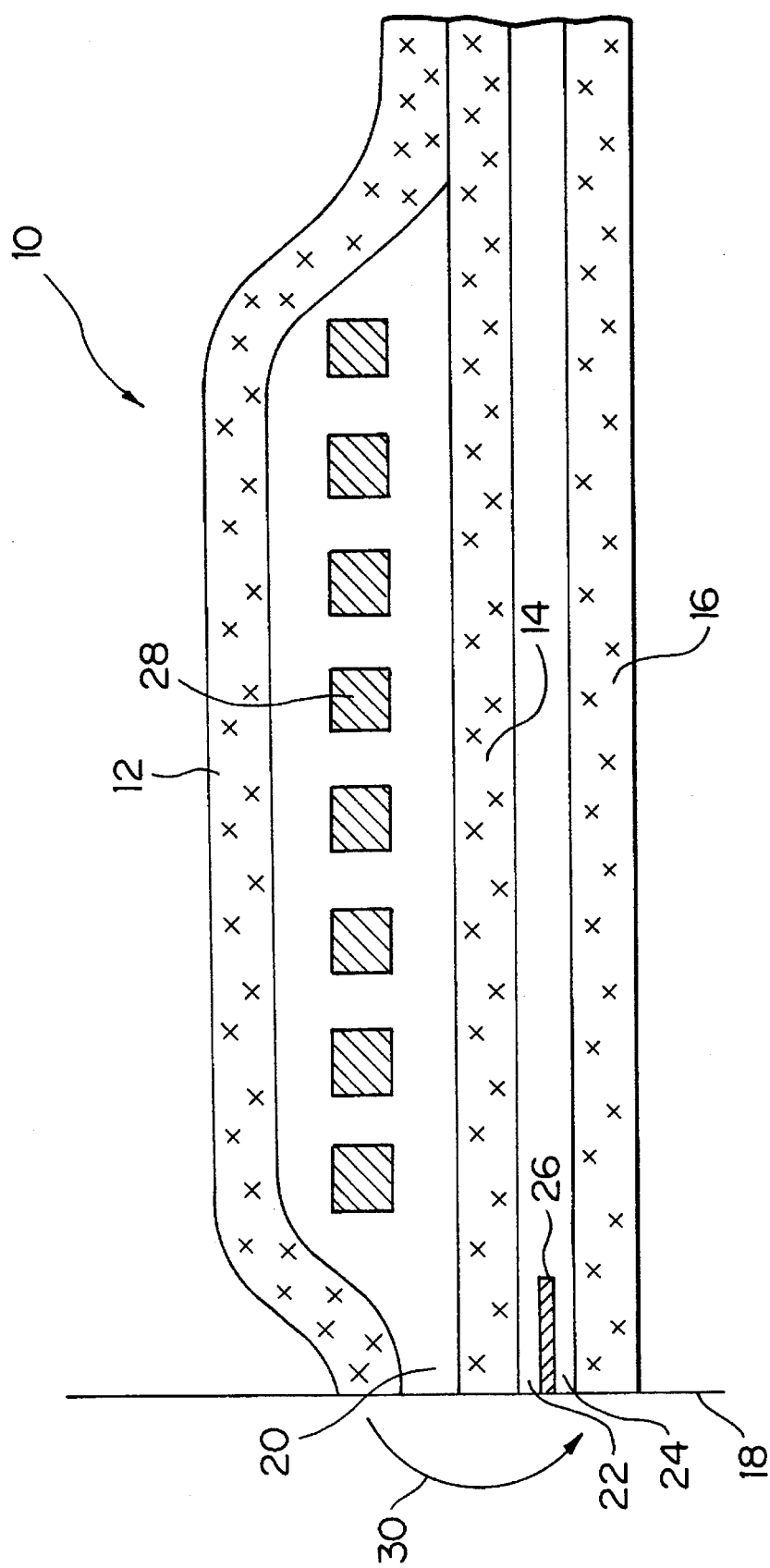
FIG. 1 is a section showing a conventional dual-element magnetic head assembly.

To better understand the present invention, a brief reference will be made to a conventional dual-element magnetic head assembly having a recording head and a MR readback head, shown in FIG. 1. As shown, the head assembly, generally indicated by number 10, has an upper magnetic yoke 12, a lower magnetic yoke 14 playing the role of an upper shield as well, a lower shield 16, a record gap 20 formed between the yokes 12 and 14 for recording data in a magnetic disk or similar magnetic recording medium 18, a MR element 26 intervening between the shields 14 and 16 and defining readback gaps 22 and 24 between it and the shields 14 and 16, and a coil 28 mounted on the yokes 12 and 14. The MR element 26 is located to face the disk 18. As a current flows through the coil 28, a recording magnetic field 30 is developed in the disk 18. In the event of readback, the MR element 26 senses transitions in the magnetic field due to a magnetization pattern recorded in the disk 18 as changes in resistance, whereby an output voltage is produced from the sense current.

The conventional dual-element head assembly 10, however, has a problem that, in the event of readback, the recording magnetic field 30 is apt to disturb the magnetized state of the MR element 26, as briefly discussed earlier. Specifically, the magnetic field 30, also acts on the MR element 26, and is sufficiently intense, compared to the coercive force of the recording medium 18, and is greater than 1000 oersteds. Such a magnetic field, therefore, is far more intense than a bias electric field of about tens of oersteds applied to the MR element 26. As a result, in a record mode, the direction of magnetization of the MR element 26 repetitively reverses depending on the direction of the magnetic field 30. If the reversals of magnetization of the MR element 26 involve hysteresis, the MR element 26 is greatly biased when the magnetic field 30 is oriented in the same direction as the bias magnetic field for the MR element 26 at the end of recording; the MR element 26 is biased shallowly if the former is oriented in the opposite direction to the latter. As the bias to the MR element 26 changes with the direction of the magnetic field 30 at the end of recording, the readback sensitivity of the element 26 and, therefore, the readback output fluctuates.

Specific configurations of a dual-element magnetic head assembly to which the present invention is applicable will be described hereinafter. In the specific configurations, the same constituent parts or elements as those shown in FIG. 1 are designated by like reference numerals, and redundant description will be avoided for simplicity.

Figure 2:
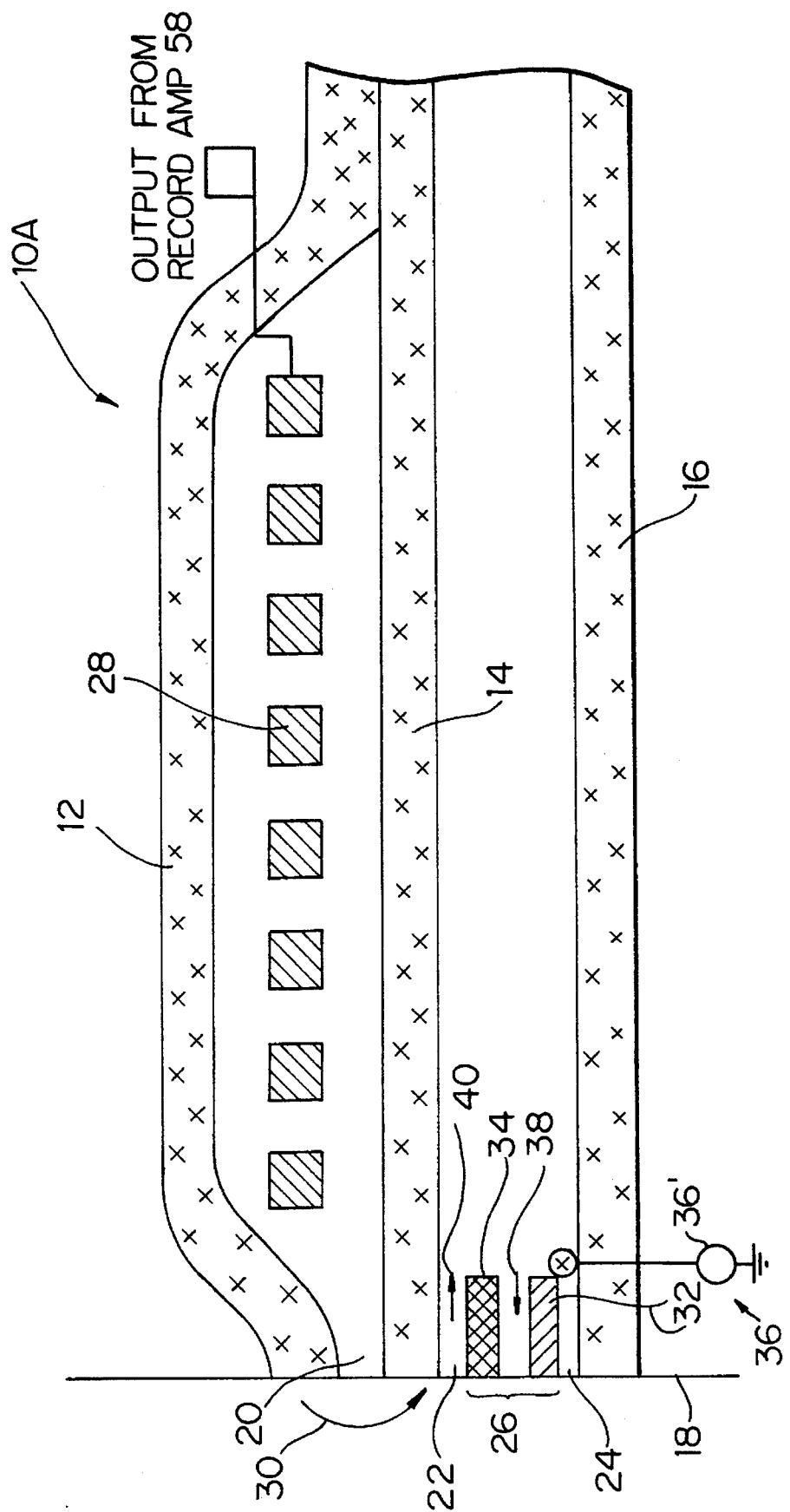
FIG. 2 shows a specific construction of a dual-element magnetic head assembly to which the present invention is applicable.

FIG. 2 shows a dual-element magnetic head assembly 10A having a recording head and a MR readback head which is made up of a MR film, a non-magnetic film, and a soft magnetic film for applying a magnetic bias to the MR film. The MR readback head is implemented by an MR element 26 to which bias is applied by a conventional soft film method. In the figure, there are shown a MR film 32, a soft magnetic film a sense current 36 (with source 36'), magnetization 38 of the MR film 32, and magnetization 40 of the soft magnetic film 34. One embodiment of the present invention which will be described is configured to drive this kind of head assembly 10A such that in the event of transition from a recording operation to a readback operation, the last record magnetic field 30 does not change in direction and coincides in direction with the magnetization 40 of the soft magnetic film 34 at all times. Specifically, when a sense current 36 flows through the MR film 32 vertically downward as viewed in FIG. 2, it generates a magnetic field and thereby orients the magnetization 40 of the soft magnetic film 34 rightward, as shown in FIG. 2. The resulting bias magnetic field ascribable to such a magnetization 40 biases the magnetization 38 of the MR film 32 leftward, as also shown in the figure. Regarding the soft film bias method using the magnetic film 34, the bias to the MR film 32 is determined by the magnetization 40 of the magnetic film 34. It follows that the bias to the MR element 26 remains stable only if the orientation of the recording magnetic field 30 at the end of a recording operation is matched to the magnetization 40 of the soft magnetic film 34.

Figure 3:
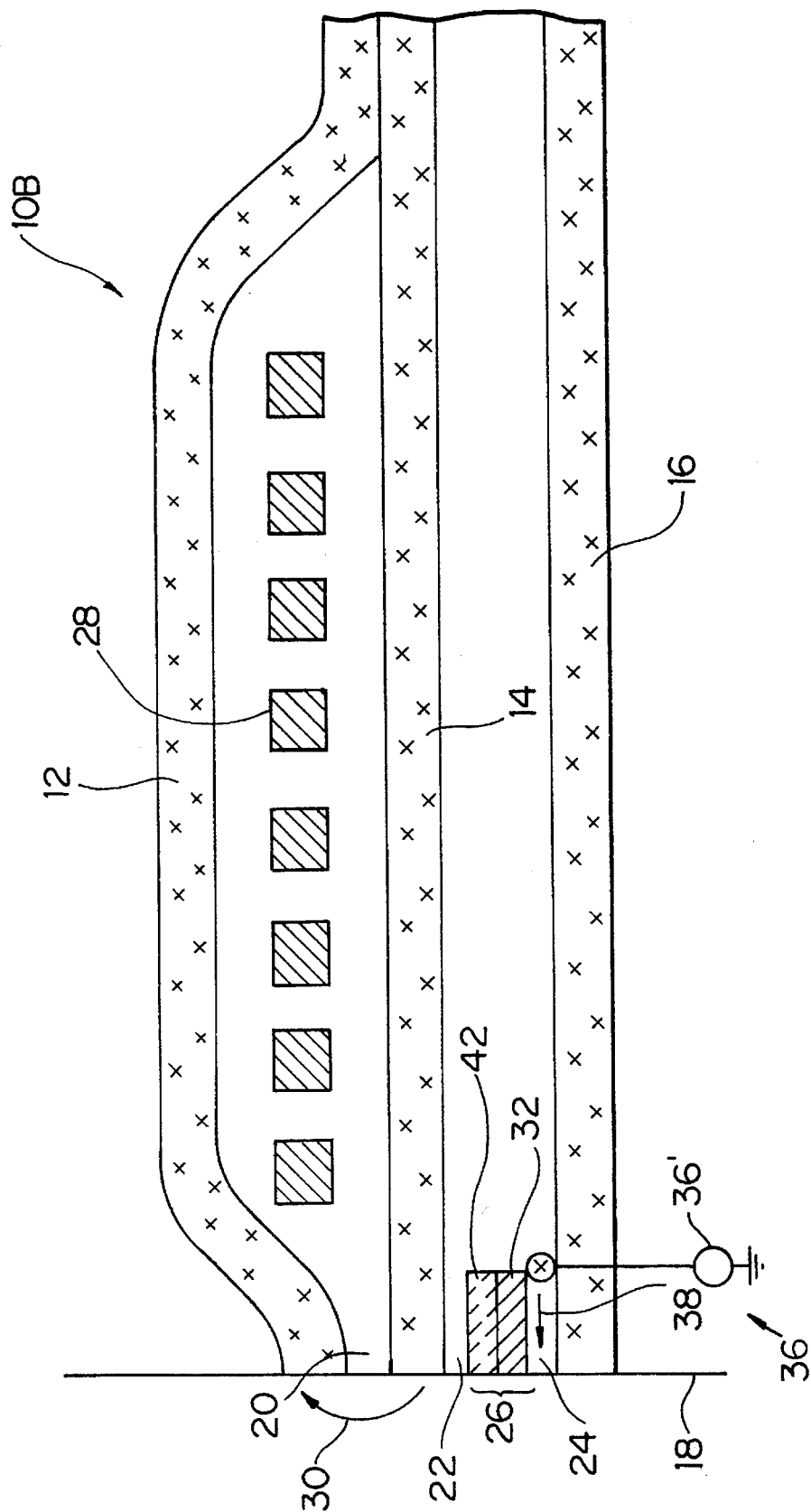
FIG. 3 shows another specific construction of the head assembly to which the invention is applicable.

Another specific configuration of the dual-element magnetic head assembly is shown in FIG. 3. As shown, a head assembly 10B is made up of a recording head and a MR readback head having a MR film and a conductive metallic film. A MR element 26 constituting the MR head is biased by the shunt bias method. The reference numeral 42 designates the shunt film. Another embodiment of the invention which will also be described is constructed to drive this kind of head assembly 10B such that the last recording magnetic field 30 does not change in direction and coincides in direction with the bias electric field of the MR film developed by a current that flows through the conductive film. Specifically, in FIG. 3, as a sense current 36 flows through a MR film 32 and the shunt film 42 vertically downward, the resulting magnetic field orients the magnetization 38 of the MR film 32 leftward. Therefore, the bias to the MR element 26 remains stable only if the orientation of the magnetic field 30 at the end of a recording operation is matched to the magnetization 38 of the MR film 32.

In the configurations shown in FIGS. 2 and 3, the sense current 36 may be continuously fed to the MR element 26 even during the recording operation. Then, the bias will continuously act on the MR element 26 during the interval between the end of recording and the beginning of readback, further stabilizing the bias to the MR element 26. To feed the sense current 36 to the MR element 26 even during recording operation, it is only necessary to hold a sense current feeding circuit, not shown, including its readback circuitry in an active state continuously.

Figure 4:
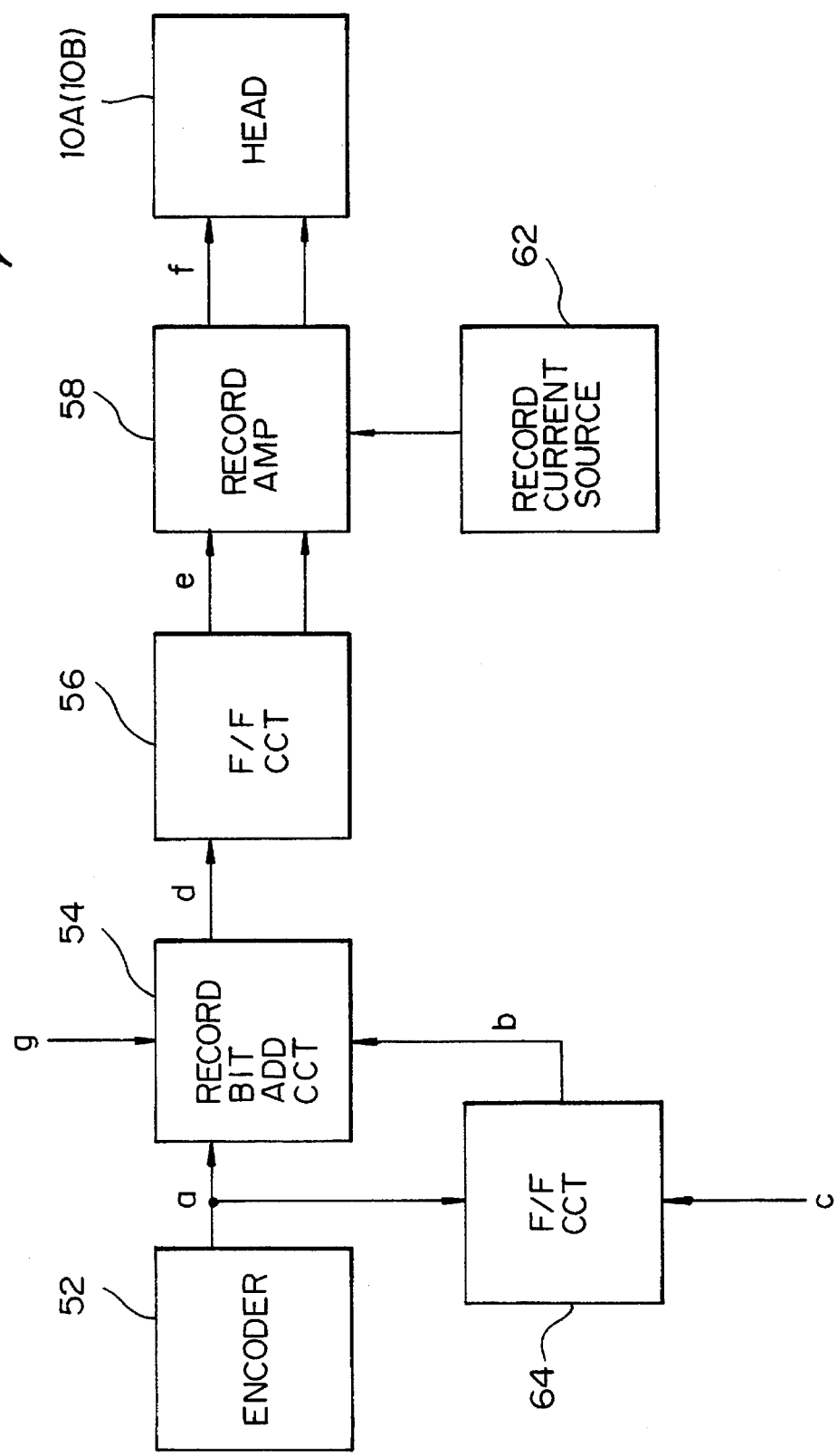
FIG. 4 is a block diagram schematically showing a magnetic head drive circuit embodying the present invention.

Referring to FIG. 4, a magnetic head drive circuit embodying the present invention is shown. As shown, the head drive circuit, generally as 50, has an encoder 52, a record bit adding circuit 54 receiving an output signal or record data "a" from the encoder 52, a flip-flop (F/F) circuit 56 to which the output signal "d" of the record bit adding circuit 54 is applied, a record amplifier (AMP) 58 receiving the output signal "e" of the F/F circuit 56, the previously stated head 10A or 10B operated by the output signal or record current "f" of the record AMP 58, a record current source 62, and a F/F circuit 64 responsive to the record data "a" from the encoder 52 and an end-of-record signal c for feeding an odd/even decision signal "b" to the record bit adding circuit 54. An end-of-record signal "g" is fed to the record bit adding circuit 54.

Figure 5:
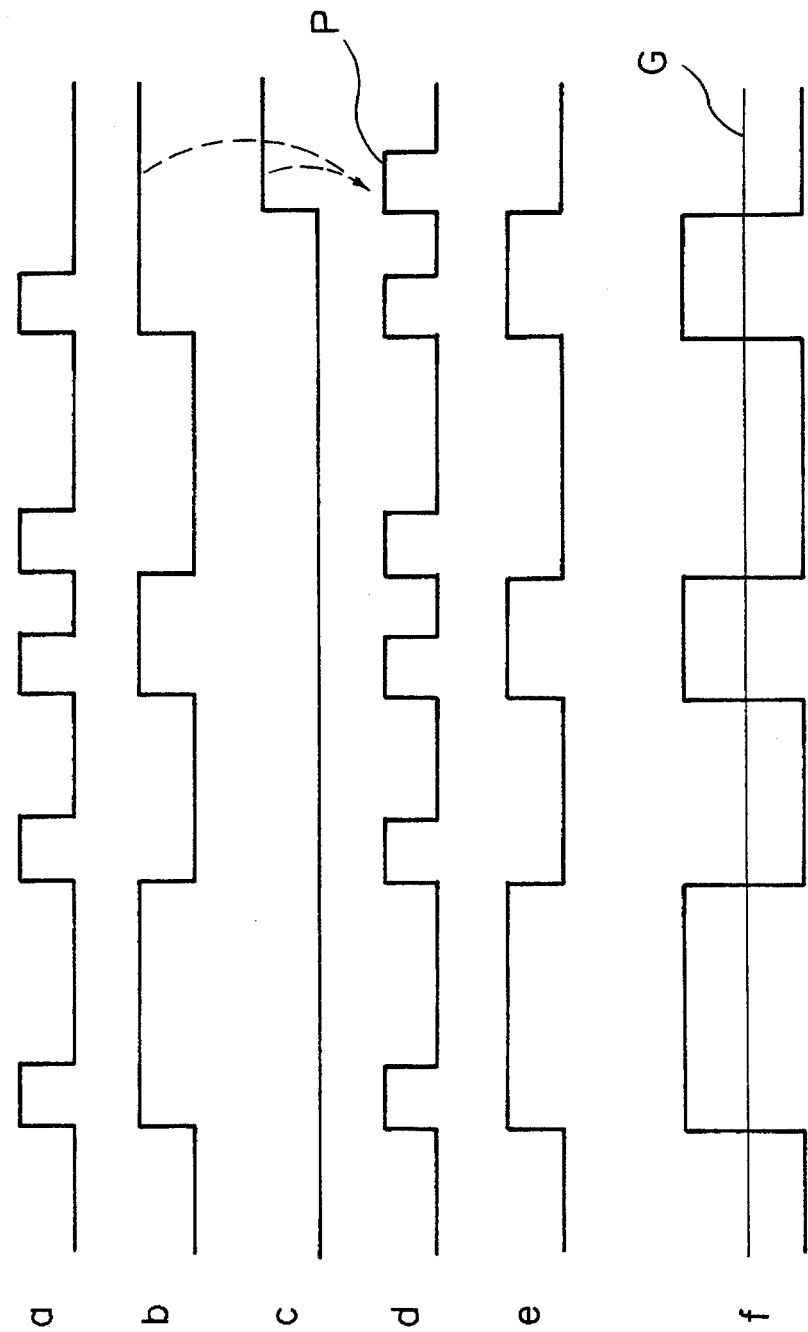
FIG. 5 is a timing chart demonstrating a specific operation of the embodiment.
Figure 6:
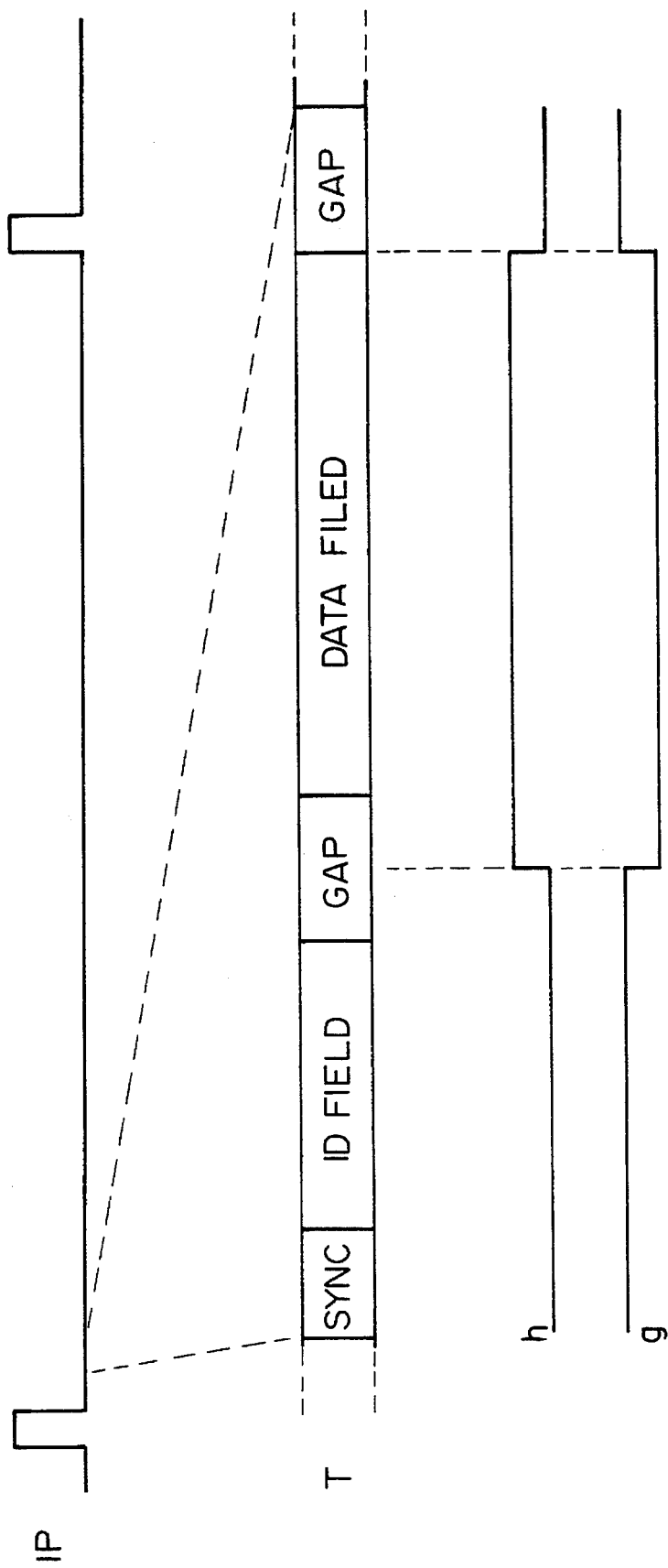
FIG. 6 is indicative of the relation between a track formed on a recording medium, a write gate signal, and an end-of-record signal to one another.

FIG. 5 shows specific waveforms of the signals a–f together with an added pulse p and a ground level G. FIG. 6 is indicative of a relation of the end-of-record signal g, a write gate signal h which will be described, the track T of the magnetic disk 18, and an index pulse IP to one another. As shown, the index pulse IP appears once per rotation of the disk 18. The track T is divided into a plurality of sectors between successive index pulses IP. Specifically, each sector has a synchronizing code SYNC at the head thereof and an identification (ID) field, a GAP field, a DATA field and a GAP field which sequentially follow the code SYNC. The code SYNC synchronizes the readback by a reading circuit to a signal reproduced from the track T, thereby insuring accurate reading thereafter. The ID field stores data designating the associated sector. The GAP field next to the ID field guarantees a period of time necessary for the reading circuit to confirm ID data before starting reading the DATA field which follows the ID field. Data is stored in the DATA field. The GAP field located at the end of the sector not only gives a margin with respect to time but also plays the role of a buffer when the DATA field changes relative to a predetermined length due to irregular rotations or similar cause.

In operation, the encoder 52 produces an output signal or record data a having been so converted as to enhance high density recording. The record data a is fed to the record bit adding circuit 54 and F/F circuit 64. The F/F circuit 64 is reset by an end-of-record signal c and determines whether the total number of record bits of the record data a is odd or even. The result of this decision, i.e., an odd/even decision signal b is delivered from the F/F circuit 64 to the record bit adding circuit 54. The odd/even decision signal b is in a high level when the number of bits is odd or in a low level when it is even. In response to the odd/even decision signal b, the record bit adding circuit 54 determines whether or not to add a pulse P when the end-of record signal c is input. In the specific condition shown in FIG. 5, since the odd/even decision signal b is in a high level, the record bit adding circuit 54 adds a pulse p to the record data to make the total number of data bits even. The resulting output signal d of the record bit adding circuit 54 is applied to the F/F circuit 56. The F/F circuit 56 converts the signal d such that one data bit of the signal d is the reversal of the record current f to be fed from the record AMP 58 to the head 10A or 10B. The record current f, therefore, reverses an even number of times without exception with no regard to the total number of data bits to be output from the encoder 52. Hence, as shown in FIG. 5, the direction of current at the end of a recording operation is negative with respect to the ground level at all times, allowing the head 10A or 10B to generate the record magnetic field 30 in the same direction at all times.

Figure 7:
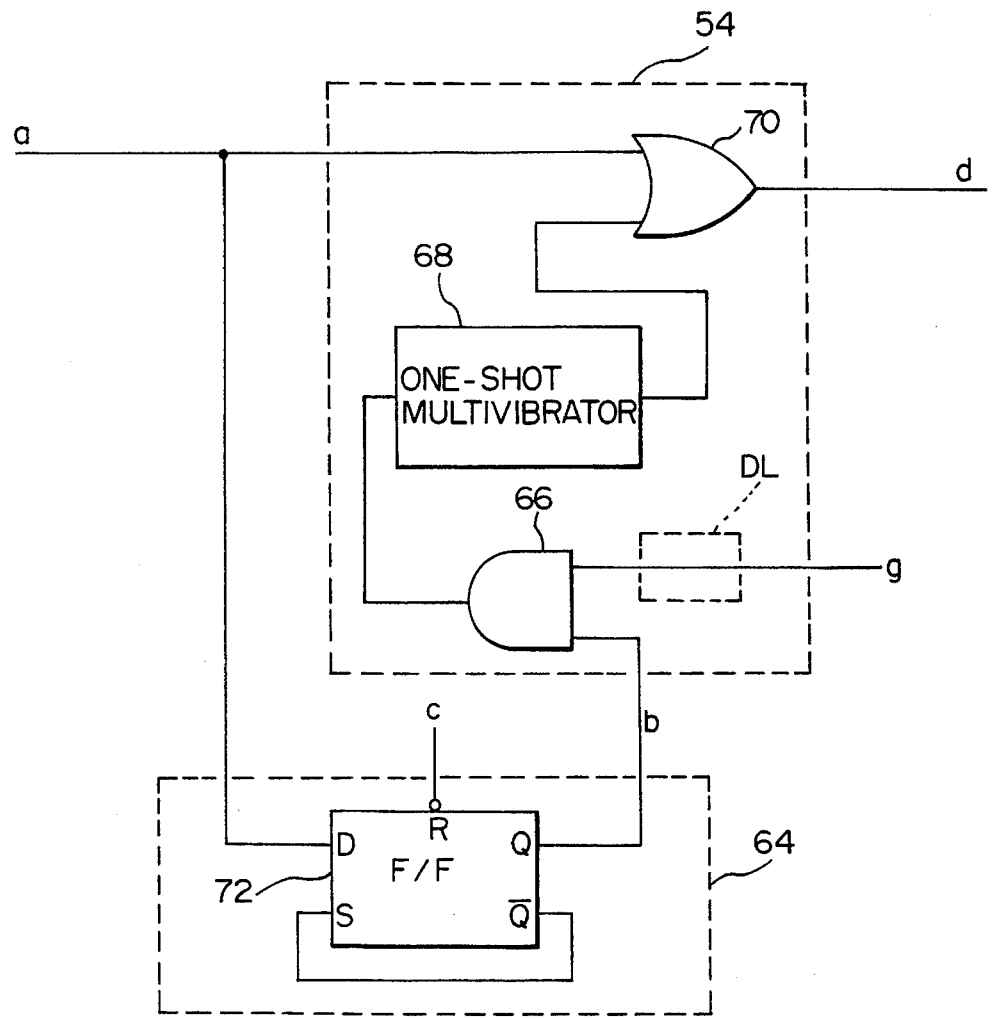
FIG. 7 is a block diagram schematically showing specific constructions of a record bit adding circuit and a flip-flop circuit included in the embodiment.

FIG. 7 shows the specific constructions of the record bit adding circuit 54 and F/F circuit 64. As shown, the record bit adding circuit 54 is made up of an AND gate 66, a one-shot multivibrator 68, and an OR gate 70, while the F/F circuit 64 is implemented by a flip-flop 72. The output signal a of the encoder 52 is applied to one input of the OR gate 70. The OR gate 70 produces OR of the signal a and the output of the one-shot multivibrator 68, delivering the OR as the signal d. Further, the flip-flop 72 counts the signal or record data a and produces the result as the odd/even decision signal b. The odd/even decision signal b and the end-of-record signal g are applied to the AND gate 66 to be ANDed thereby. The resulting AND is fed from the AND gate 66 to the one-shot multivibrator 68. The multivibrator 68 outputs pulses similar to the record data a at the positive-going edges of the input. The pulses from the multivibrator 68 are delivered to the other input of the OR gate 70. The odd/even-decision signal b is in a high level when the number of pulses existing in the signal a is odd, as stated earlier. The end-of-record signal g goes high at the end of recording. Therefore, when the signal a contains an odd number of pulses, the one-shot multivibrator 68 produces another pulse as the output d on the arrival of the end-of-record signal g. Since this additional pulse is output together with the end-of-record signal g, it causes a reversal of magnetization to occur in the last GAP field of the sector shown in FIG. 6. This reversal does not lie in the DATA field of the sector and is, therefore, not regarded as data in the event of readback. When an odd number of pulses are output at the time of arrival of the end-of-record signal 9, the one-shot multivibrator 68 does not operate. It follows that every time a recording operation is completed, a current flows through the head 10A or 10B in the same direction without exception.

The record bit adding circuit 54 may additionally include a delay circuit DL, as indicated by a dotted line in FIG. 7. When the delay circuit DL is absent, the additional bit will be output simultaneously with the end-of-record signal g. Specifically, the delay circuit DL will allow the additional bit to appear shortly after the end-of-record signal g. This is successful in causing the reversal of magnetization to occur at, for example, the center of the last GAP field, FIG. 6. While the end-of-record signal c is identical with the end-of-record signal g, it is delayed before being applied to the reset terminal R of the flip-flop 72 in order to reset the F/F circuit 64 after the sequence of steps.

Figure 8:
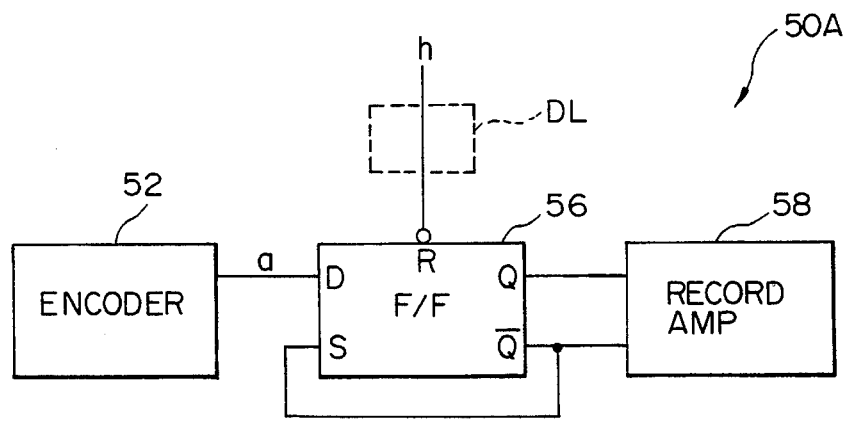
FIG. 8 is a block diagram schematically showing an alternative embodiment of the present invention.

Referring to FIG. 8, an alternative embodiment of the present invention will be described. In FIG. 8, the same blocks as the blocks of the above embodiment are designated by like reference numerals, and redundant description will be avoided for simplicity. As shown, a head drive circuit 50A does not include the record bit adding circuit 54 or the F/F circuit 64 and, instead, assigns the record bit adding function to the F/F circuit 56. The output signal or record data a from the encoder 52 is directly applied to the F/F circuit 56 while the output of the F/F circuit 56 is fed to the record AMP 58. The write gate signal h, FIG. 6, is delivered to the reset terminal R of the F/F circuit 56; the circuit 56 remains in a reset state when the signal h is absent. As a result, when a writing operation is not under way, a current flows through the head 10A or 10B in a direction corresponding to the reset state. This embodiment may also include a delay circuit DL, as indicated by a dotted line in the figure. In this case, however, care should be taken since the delay circuit DL acts even at the beginning of a writing operation. For example, the delay circuit DL may delay only the last negative-going edge.

Figure 9:
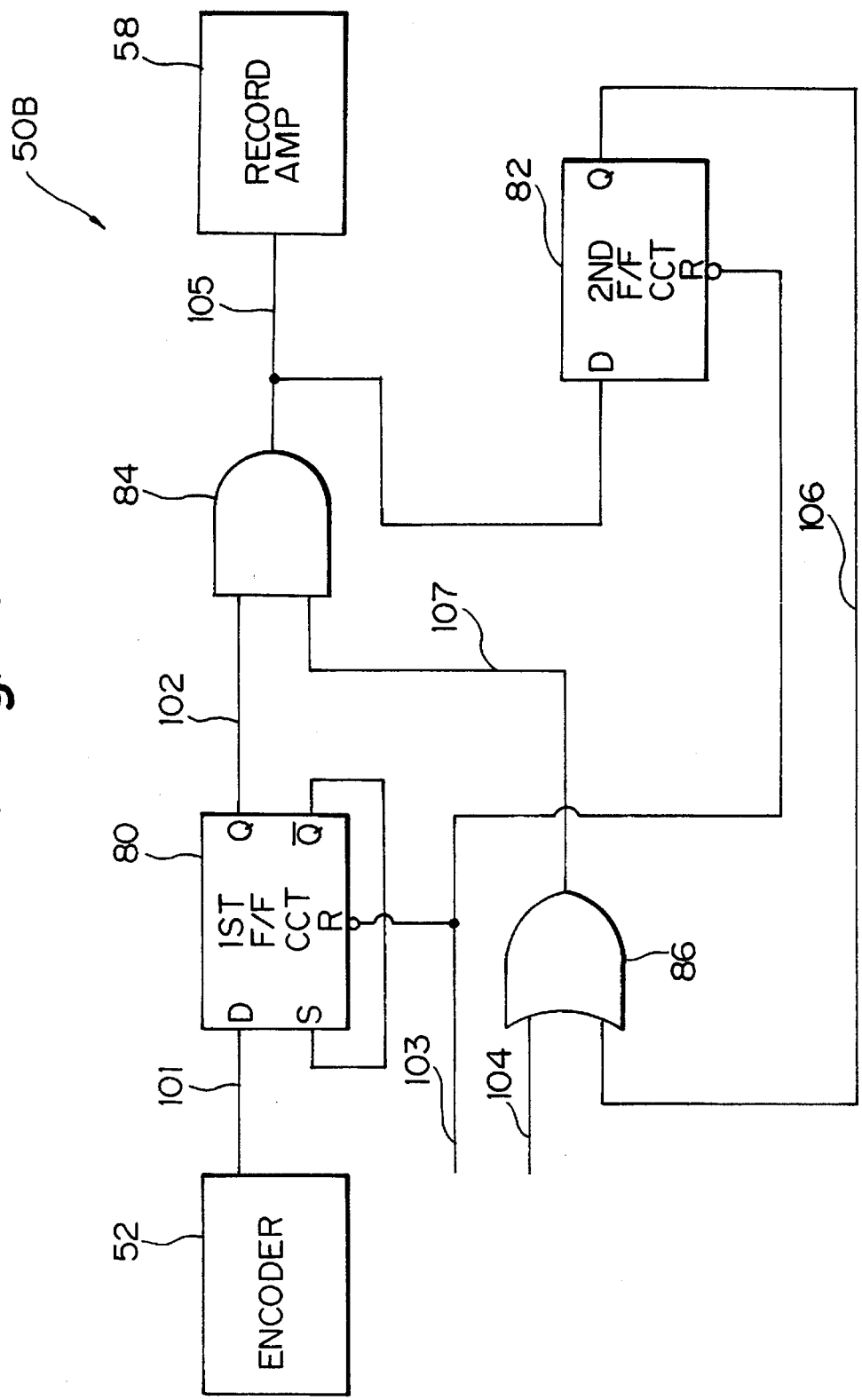
FIG. 9 is a block diagram schematically showing another alternative embodiment of the present invention.
Figure 10:
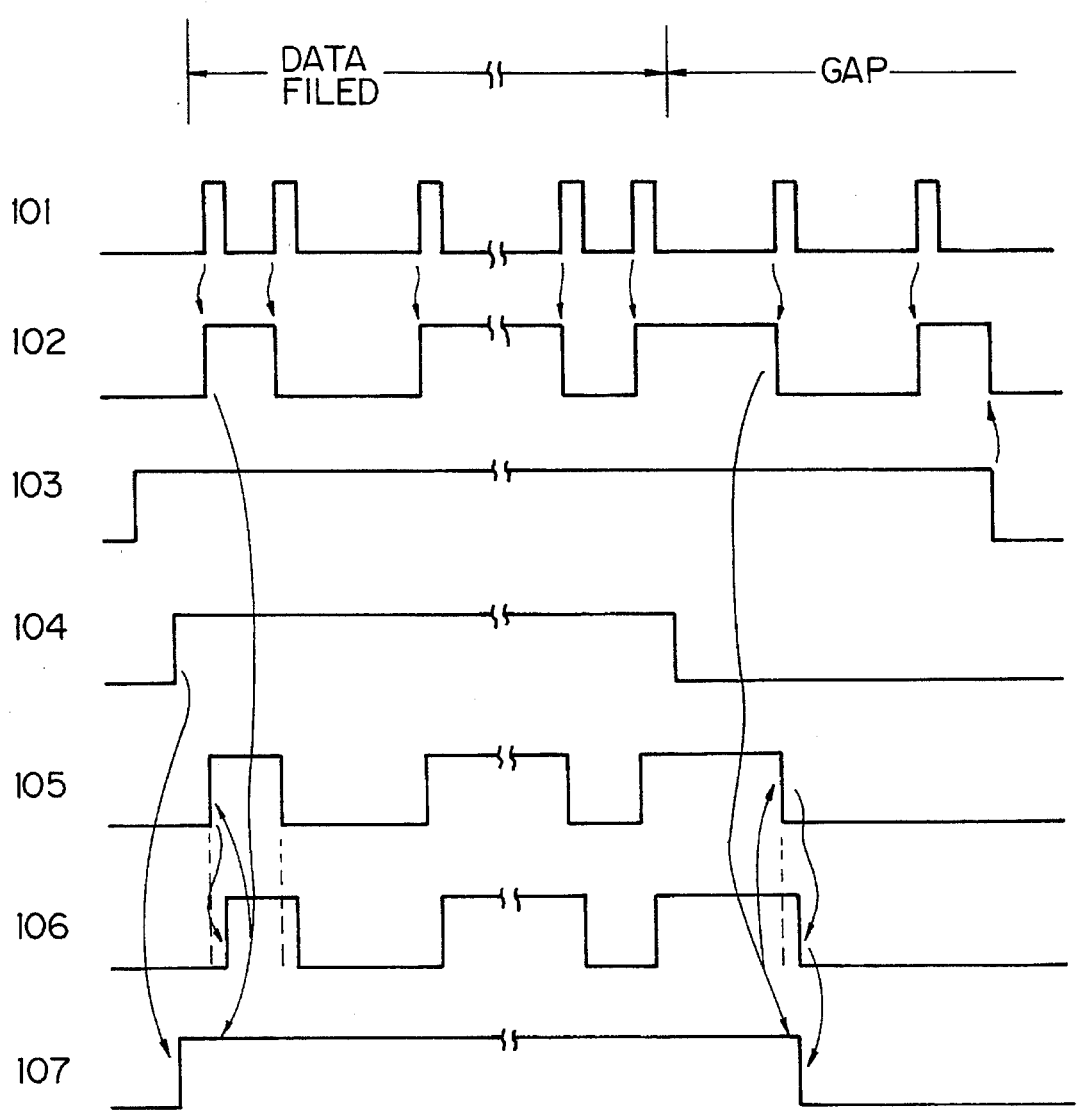
FIG. 10 is a timing chart representative of a specific operation of the embodiment shown in FIG. 9.

FIGS. 9 and 10 show another alternative embodiment of the present invention. In these figures, the same blocks as the blocks of the previous embodiments are designated by like reference numerals, and redundant description will be avoided for simplicity. As shown in FIG. 9, a head drive circuit 50B has a first and a second F/F circuit 80 and 82, an AND gate 84, and an OR gate 86 which follow the F/F circuit 56, FIG. 4, in order to implement the record bit adding function. As FIG. 10 indicates, record data 101 output from the encoder 52 appears even after the transition of the sector of the track T from the DATA field to the GAP field. This is because the encoder 52 generally so modulates the input thereof for the purpose of causing the reversal of magnetization to occur even with an all-zeros pattern. However, in the GAP field, the data are not output from the head 10A or 10B when a write gate signal 104 goes low. In this embodiment, if an odd number of record data 101 are output when the write gate signal 104 goes low, only one of reversals ascribable to the succeeding record data 101 is made valid.

The output signal 102 of the F/F circuit 80 and the output signal 107 of the OR gate 86 are applied to the AND gate 84. The signal 107 is a gate signal. When the gate signal 107 is in a high level, the signal 102 is produced from the AND gate 84 as an output signal 105 and fed to the record AMP 58. The write gate signal 104 and the output signal 106 of the F/F circuit 82 are fed to the OR gate 86. The F/F circuit 82 repetitively holds and updates the output signal 5 of the AND gate 84 at short intervals. The reference numeral 103 designates a chip enable signal. That the AND gate 84 is open to the signal 102 means that the write gate signal 104 is present or that the F/F circuit 82 is in a high level. Hence, if the signal 105 is in a high level when the write gate signal 104 goes low at the end of writing, the signal 106 is also in a high level to still allow the AND gate 84 to gate the signal 102. As soon as the signal 102 goes low, the signal 105 and, therefore, the signal 106 goes low. Then, the signal 107 goes low with the result that the AND gate 84 is disenabled and stops gating the signal 102. At the end of writing, the AND gate 84 will be disenabled immediately if the signal 105 is in a low level.

In summary, it will be seen that the present invention provides a magnetic head drive circuit which stabilizes a bias to a MR element after a recording operation, allows a minimum of noise to occur during readback, and prevents the readback output from fluctuating every time a recording operation is performed. This is because the invention orients a magnetic field at the end of a recording operation in a direction for deepening the bias to the MR element and because it applies a bias magnetic field for the MR element even during recording operation.

Various modifications will become possible for those skilled in the art after receiving the teachings of the present disclosure without departing from the scope thereof.

What is claimed is:

1. A drive circuit for driving a dual-element magnetic head assembly, comprising:

a magnetoresistive (MR) readback head including an MR film and a soft magnetic film, said soft magnetic film applying a magnetic bias to said MR film;

a record magnetic head for generating a magnetic field by means of a magnetic yoke having upper and lower magnetic shields, a coil wound around said magnetic yoke, and a gap formed between said upper and lower magnetic shields at a side where said record magnetic head faces a magnetic recording medium;

an encoder for generating record data having a number of recorded bits, said record data being supplied to a flip/flop circuit;

an end of record signal also supplied to said flip/flop circuit, said flip/flop circuit determining, upon receiving said end of record signal, whether the number of recorded bits of said record data is odd or even; and a record bit adding circuit, said odd or even determination being supplied to said record bit adding circuit;

wherein said record bit adding circuit selectively outputs an additional pulse in response to said odd or even determination, said record magnetic head being responsive to said additional pulse output of said record bit adding circuit so that said magnetic field in the vicinity of said MR readback head is always in the same direction after transition of said dual element magnetic head assembly from a recording operation to a readback operation, and thus the direction of the magnetic field at the soft magnetic film coincides with the direction of a magnetization in said soft magnetic film.

2. A circuit as claimed in claim 1, wherein a sense current is fed even when said dual-element head assembly is performing a recording operation.

3. A drive circuit for driving a dual-element magnetic head assembly as claimed in claim 1, wherein said additional pulse added by said record bit adding circuit is recorded onto said magnetic recording medium in a position corresponding to a gap region of said magnetic recording medium.

4. A drive circuit for driving a dual-element magnetic head assembly as claimed in claim 1, wherein said record bit adding circuit selectively outputs said additional pulse in response to said odd or even determination to assure that the number of recorded bits of said record data is an even number.

5. A drive circuit for driving a dual-element magnetic head assembly, comprising:

a magnetoresistive (MR) readback head including an MR film and a soft magnetic film, said soft magnetic film applying a magnetic bias to said MR film;

a record magnetic head for generating a magnetic field, said record magnetic head including a magnetic yoke having upper and lower magnetic shields, a coil wound around said magnetic yoke, and a gap formed between said upper and lower magnetic shields at a side where said record magnetic head faces a magnetic recording medium;

an encoder for generating record data having a number of recorded bits;

a first flip-flop circuit connected to said encoder and configured to receive said record data and an end of record signal, said first flip-flop circuit determining, upon receiving said end of record signal, whether the number of recorded bits of said record data is odd or even and outputting a determination signal as a result thereof;

a record bit adding circuit connected to receive said determination signal from said first flip-flop circuit and said record data from said encoder, and configured to add an additional bit to said record data as needed to assure that said record data output from said record bit adding circuit always includes an even number of bits;

a second flip-flop connected to said record bit adding circuit and configured to output an odd/even signal having one of a first state and a second state, said odd/even signal being in said first state when said record data output from said record bit adding circuit corresponds to an even number of bits, and said odd/even signal being in said second state when said record data output from said record bit adding circuit corresponds to an odd number of bits; and a record amplifier connected to said second flip-flop and configured to output a bipolar signal having one of a positive state and a negative state, said bipolar signal being in said positive state when said odd/even signal is in said first state, and said bipolar signal being in said negative state when said odd/even signal is in said second state, wherein said record magnetic head being responsive to said bipolar signal such that said magnetic field in the vicinity of said MR readback head is always in the same direction after transition of said dual element magnetic head assembly from a recording operation to a readback operation, and thus the direction of the magnetic field at the soft magnetic film coincides with the direction of a magnetization in said soft magnetic film.

6. A drive circuit for driving a dual-element magnetic head assembly as claimed in claim 5, wherein said additional bit added to said record data by said record bit adding circuit results in a bit of data recorded onto said magnetic recording medium in a position corresponding to a gap region of said magnetic recording medium.

7. A drive circuit for driving a dual-element magnetic head assembly having a magnetoresistive (MR) readback head and a record magnetic head, comprising:

an encoder for generating record data having a number of recorded bits;

odd/even determination means, connected to said encoder and configured to receive said record data and an end of record signal, for determining whether the number of recorded bits of said record data is odd or even and outputting a determination signal as a result thereof;

a record bit adding circuit connected to receive said determination signal and said record data from said encoder, and configured to add an additional bit to said record data as modified record data to assure that said modified record data output from said record bit adding circuit always includes an even number of bits, wherein said record magnetic head being responsive to said modified record data such that a magnetic field in the vicinity of said MR readback head is always in a same direction after transition of said dual element magnetic head assembly from a recording operation to a readback operation.

* * * * *